US008996715B2

(12) United States Patent
Roy et al.

(10) Patent No.: US 8,996,715 B2
(45) Date of Patent: Mar. 31, 2015

(54) APPLICATION FIREWALL VALIDATION BYPASS FOR IMPROMPTU COMPONENTS

(75) Inventors: Patrick Roy, Gatineau (CA); Robert Desbiens, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 2199 days.

(21) Appl. No.: 11/473,914

(22) Filed: Jun. 23, 2006

(65) Prior Publication Data

US 2007/0299984 A1     Dec. 27, 2007

(51) Int. Cl.
*G06F 15/16*     (2006.01)
*H04L 29/06*     (2006.01)
*H04L 29/08*     (2006.01)

(52) U.S. Cl.
CPC .......... *H04L 63/0245* (2013.01); *H04L 63/123* (2013.01); *H04L 67/02* (2013.01); *H04L 63/12* (2013.01); *H04L 63/029* (2013.01)
USPC .......................................... 709/232; 709/230

(58) Field of Classification Search
CPC ....... H04L 67/02; H04L 63/029; H04L 63/12; H04L 63/0245; H04L 63/123
See application file for complete search history.

(56) References Cited

U.S. PATENT DOCUMENTS

| 6,985,939 | B2 | 1/2006 | Fletcher et al. | |
|---|---|---|---|---|
| 8,015,117 | B1 * | 9/2011 | Lillibridge et al. | 705/74 |
| 2005/0138382 | A1 * | 6/2005 | Hougaard et al. | 713/176 |
| 2005/0198332 | A1 * | 9/2005 | Laertz et al. | 709/229 |
| 2005/0256808 | A1 * | 11/2005 | Allamaraju et al. | 705/67 |
| 2006/0041637 | A1 | 2/2006 | Jerrard-Dunne | |

OTHER PUBLICATIONS

Josefsson, S., "The Base16, Base32, and Base64 Data Encodings", RFC 3548, IETF, Jul. 2003.*

* cited by examiner

*Primary Examiner* — Hieu Hoang
*Assistant Examiner* — Nam Tran
(74) *Attorney, Agent, or Firm* — Shumaker & Sieffert, P.A.

(57) ABSTRACT

A method of controlling data transfer between a Web client and a Web application by building a response with a target. The target indicates a destination to an impromptu component of the Web application. The target is signed when a response is built. After receiving the response by the Web client; the corresponding a request from the Web client includes the signed target. The request is received by an entry point of the Web application. The entry point has existing validation rules. The validation rules are by-passed when the signed target is verified. The target is restored in the request to the original state; and dispatched to the impromptu component.

29 Claims, 8 Drawing Sheets

<target> =
b_action=xts.run&m=portal/cc.xts&m_page=i0AD13537E49148EE89D5120
E294DE952

Figure 5 (b)

<signedTarget> =
Q0FGQYNjMDAwMDAwNGVGQUFBQUI4SVVnaEx6M2I4bm52VYRhdEhW
czQqSU02am5NcYFIVYdRWmpoaU1wS1o0d2JXKmtaUYRORV9iX2FjdGlv
bj14dHMucnVuJm09cG9ydGFsL2NjLnh0cyZtX3BhZ2U9aYBBRDEzNYM3R
YQ5MYQ4RUU4OUQ1MYIwRYI5NERFOYUyJnJ1aY0_

Figure 5 (c)

APPLICATION FIREWALL VALIDATION BYPASS FOR IMPROMPTU COMPONENTS

FIELD OF INVENTION

The present invention relates to Web applications. More specifically, the present invention relates to Web application security.

BACKGROUND OF THE INVENTION

The Internet is by far the largest, most extensive publicly available network of interconnected computer networks that transmit data by packet switching using a standardized Internet Protocol (IP) and many other protocols. The Internet has become an extremely popular source of virtually all kinds of information. Increasingly sophisticated computers, software, and networking technology have made Internet access relatively straightforward for end users. Applications such as electronic mail, online chat and web client allow the users to access and exchange information almost instantaneously.

The World Wide Web (WWW) is one of the most popular means used for retrieving information over the Internet. The WWW can cope with many types of data which may be stored on computers, and is used with an Internet connection and a Web client. The WWW is made up of millions of interconnected pages or documents which can be displayed on a computer or other interface. Each page may have connections to other pages which may be stored on any computer connected to the Internet. Uniform Resource Identifiers (URI) is an identifying system in WWW, and typically consists of three parts: the transfer format (also known as the protocol type), the host name of the machine which holds the file (may also be referred to as the web server name) and the path name to the file. URIs are also referred as Universal Resource Locators (URLs). The transfer format for standard web pages is Hypertext Transfer Protocol (HTTP). Hyper Text Markup Language (HTML) is a method of encoding the information so it can be displayed on a variety of devices.

Web applications are engines that create Web pages from application logic, stored data, and user input. Web applications often preserve user state across sessions. Web applications do not require software to be installed in the client environment. Web applications make use of standard Web browser components to view server-side built pages. Web application can also deliver services through programmatic interface like Software Development Kits (SDKs).

HTTP is the underlying transactional protocol for transferring files (text, graphic images, sound, video, and other multimedia files) between web clients and servers. HTTP defines how messages are formatted and transmitted, and what actions web servers and web client browsers should take in response to various commands. A web browser as an HTTP client, typically initiates a request by establishing a TCP/IP connection to a particular port on a remote host. An HTTP server monitoring that port waits for the client to send a request string. Upon receiving the request string (and message, if any), the server may complete the protocol by sending back a response string, and a message of its own, in the form of the requested file, an error message, or any other information. The HTTP server can take the form of a Web server with gateway components to process requests. A gateway is a custom web server module or plug-in created to process requests, and generally is the first point of contact for a web application. The term "gateway" is intended to include any gateways known to a person skilled in the art, for example, CGI; ISAPI for a web server; a web server module, or a servlet.

Web pages regularly reference to pages on other servers, whose selection will elicit additional transfer requests. When the browser user enters file requests by either "opening" a Web file by typing in a Uniform Resource Locator (URL), or clicking on a hypertext link, the browser builds an HTTP request. In actual applications, Web clients may need to be distinguished and authenticated, or a session which holds a state across a plurality of HTTP protocols may need to be maintained by using "state" called cookie.

Web applications incur a security risk by accepting user input in their application logic. To reduce this risk, Web application firewall validates input to Web application before it is used in application logic. Web application entry point, for example, application firewall typically examine incoming request, apply generic security rules, and reject requests that fail to comply with these rules. A security rule can for example reject value longer than 256 characters for a title parameter. Web application validation rules are tied to a specific Web application. A Web application firewall will be used by many components of a Web application. Each component having it corresponding set of validation rules.

Dynamic content may be provided by service-oriented (SOA) for distributed computing. In general, SOA integrates distributed applications in the Internet which are loosely coupled, highly interoperable. SOA provides an interface describing a collection of network-accessible operations, and encapsulating the vendor and language-specific implementation. A SOA is independent of development technology, for example, a C# service could be used by an application of a different language-specific implementation than C#. Web services as defined in SOA work with other web services in an interoperable manner to carry out respective part of a complex business transaction. For example, completing a purchase order may require automated interaction between an order placement service and an order fulfillment service.

One of the convenient and therefore widely used methods for accessing information over the Internet is to access information over the WWW using web portals. Web portals offer a structured approach to provide personalized capabilities to the visitors, e.g. by subject (category) then sub-category.

Web portals serve as a common access point to various distributed applications that are related, for example, to programs of a business. Web portals use distributed applications, different numbers and types of middleware, and hardware to provide services from a number of different sources. Web portals may be delivered in a hypertext markup language document (i.e., a HTML web page) over a public network such as Internet. For example, Web portals may be accessible at a single uniform resource locator (URL) address and integrate disparate, but related databases and systems of a business. Web portals therefore can deliver customized content within a standard template and using a common user interface mechanism.

Web portals usually aggregate dynamic Web content, which is processed and generated by portlets. Many portlets may therefore be invoked in a single request of a portal page. Each portlet obtains a fragment of the content that is to be rendered as part of the portal page. Portlets therefore summarize, promote or provide basic access to an information resource for a group of users who find business value in the information. Access may also include secure resources through integrated portal authentication and single-sign on.

U.S. Pat. No. 6,985,939 describes a portlet model leveraged to allow programmatic portlets to serve as proxies for web services, and extending portlets beyond their visual role. U.S. Pat. No. 6,985,939 further describes a deployment interface and a system interface for the portlet proxies. The deployment interface is used for composing new web services. The system interface allows for run-time management of the web services by the portal platform.

US Application 20060041637 describes a portal server which uses a reverse proxy mechanism for proxying Web applications on a backend server in response to a request for Web content from a user. The reverse proxy mechanism has a portlet, a set of configuration rules, and a rewriting mechanism. The rewriting mechanism is configured to forward a user request for Web content to a Web application on the backend server, receive a response from the Web application, and rewrite the received response in accordance with the configuration rules. The portlet is configured to produce a content fragment for a portal page from the rewritten response. The configuration rules include rules for rewriting any resource addresses, such as URLs, appearing in the received response from the Web application to point to the portal server rather than to the backend server. A separate backend server is behind a firewall and the reverse proxy function of the portlet allows a user to access the Web application on the portal server, without the need to allow the user to have direct access to the backend server and backend application which provide the actual content.

Custom portlets may be created by any application or information resource provider, based on published specifications. A Web application supporting custom portlets need to allow data of these portlets to pass through its entry point, for example, an application firewall without compromising the security for its other components.

Therefore, there is a need for a method and apparatus that allows requests targeted at specific components, for example, custom portlets, to bypass validation in a secure manner.

SUMMARY OF THE INVENTION

According to one aspect of the present invention there is provided a method of controlling data transfer between a Web client and a Web application comprising the steps of: building a response with a target, the target indicating a destination to an impromptu component of the Web application and having an original state; signing the target in the response, resulting in a signed target; receiving the response by the Web client; sending a request including the signed target destined to the impromptu component; receiving the request by an entry point of the Web application, the entry point having a validation rule; verifying the signed target; restoring the target in the request to the original state; and dispatching the request having the target to the impromptu component.

Preferably, the validation rule is by-passed.
Preferably, the impromptu component is a portlet.
Preferably, the target comprises a plurality of request parameters.
Preferably, the entry point is a validation engine.
Preferably, the entry point is an application firewall.
Preferably, the signing step further comprises the step of using session information to prevent a reuse of the signed target in a different session.
Preferably, the step of signing the target further comprises a step of transforming the signed target.
Preferably, the step of transforming comprises a step of rearranging names and values of a plurality of parameters of the request, resulting in a new unique parameter.
Preferably, the step of transforming comprises a step of encoding.

Preferably, the target is signed by the entry point.
Preferably, the target is signed by the Impromptu Component Manager.
Preferably, the Web client is a simple object access protocol (SOAP) client.

According to another aspect of the present invention there is provided a method of controlling data transfer between a Web client and a Web application comprising the steps of: building a response with a target, the target indicating a destination to an impromptu component of the Web application and having an original state; signing the target in the response, resulting in a signed target; receiving the response by the Web client; sending a request including the signed target and a parameter destined to the component; receiving the request by an entry point of the Web application, the entry point having a validation rule; verifying the signed target; restoring the target in the request to the original state; transforming the parameters for protecting parameters of the impromptu component resulting in a transformed parameter; dispatching the request having the target and the transformed parameter to the component; and restoring the transformed parameter.

Preferably, the transforming step comprises an encoding step.
Preferably, the validation rule is by-passed.
Preferably, the impromptu component is a portlet.
Preferably, the entry point is a validation engine.
Preferably, the entry point is an application firewall.
Preferably, the target is signed by the entry point.

According to another aspect of the present invention there is provided a storage medium readable by a computer encoding a computer program for execution by the computer to carry out a method for controlling data transfer between a Web client and a Web application, the computer program comprising: code means for building a response with a target, the target indicating a destination to an impromptu component of the Web application and having an original state; code means for signing the target in the response, resulting in a signed target; code means for receiving the response by the Web client; code means for sending a request including the signed target destined to the impromptu component; code means for receiving the request by an entry point of the Web application, the entry point having a validation rule; code means for verifying the signed target; code means for restoring the target in the request to the original state; and code means for dispatching the request having the target to the impromptu component.

According to another aspect of the present invention there is provided a storage medium readable by a computer encoding a computer program for execution by the computer to carry out a method for controlling data transfer between a Web client and a Web application, the computer program comprising: code means for building a response with a target, the target indicating a destination to an impromptu component of the Web application and having an original state; code means for signing the target in the response, resulting in a signed target; code means for receiving the response by the Web client; code means for sending a request including the signed target and a parameter destined to the component; code means for receiving the request by an entry point of the Web application, the entry point having a validation rule; code means for verifying the signed target; code means for restoring the target in the request to the original state; code means for transforming the parameters for protecting parameters of the impromptu component resulting in a transformed parameter; code means for dispatching the request having the target and the transformed parameter to the component; and code means for restoring the transformed parameter.

BRIEF DESCRIPTION OF THE DRAWINGS

The invention and the illustrated embodiments may be better understood, and the numerous objects, advantages, and features of the present invention and illustrated embodiments will become apparent to those skilled in the art by reference to the accompanying drawings. In the drawings, like reference numerals refer to like parts throughout the various views of the non-limiting and non-exhaustive embodiments of the present invention, and wherein:

FIG. 5(*b*) shows an exemplary target before the signing; FIG. 5(*c*) shows an exemplary target after signing in accordance with one embodiment of the present invention;

DETAILED DESCRIPTION OF A PREFERRED EMBODIMENT

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1:
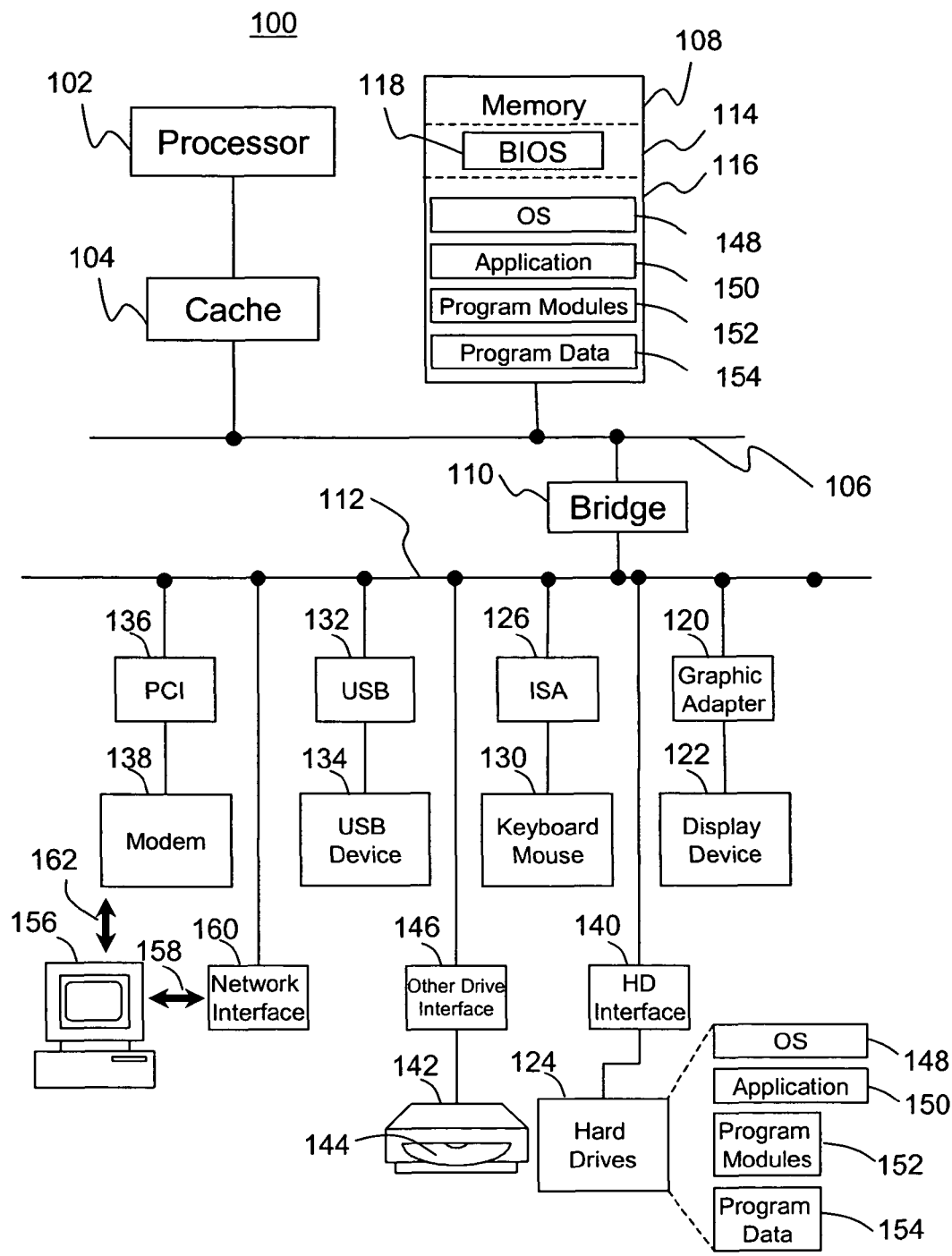
FIG. 1 shows a generic computing system in which the present invention may be implemented.

FIG. 1 and the following discussion are intended to provide a brief general description. FIG. 1 illustrates a block diagram of a suitable computing environment in which a preferred embodiment of the present invention may be implemented.

Those skilled in the art will appreciate that the invention may be practiced with many computer system configurations, including personal computers, hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Although not required, the invention will be described in the general context of computer-executable instructions, such as program modules, being executed by a personal computer. Generally, program modules include routines, programs, objects, components, data structures and the like that perform particular tasks or implement particular abstract data types.

With reference to FIG. 1 an exemplary system 100 for implementing the invention may be, for example, one of the general purpose computers. The system 100 includes processor 102, which in the exemplary embodiment are each connected to cache memory 104, the cache 104 is connected in turn to a system bus 106 that couples various system components.

Also connected to system bus 106 are a system memory 108 and a host bridge 110. Host bridge 110 connects I/O bus 112 to system bus 106, relaying and/or transforming data transactions from one bus to the other. The system bus 106 and the I/O bus 112 may be any of several types of bus structures including a memory bus or memory controller, a peripheral bus, and a local bus using any of a variety of bus architectures. The system memory includes read-only memory (ROM) 114 and random access memory (RAM) 116. A basic input/output system 118 (BIOS), containing the basic routines that help to transfer information between elements within the personal computer 100, such as during start-up, is stored in ROM 114.

In the exemplary embodiment, the system 100 may further include a graphics adapter 120 connected to I/O bus 112, receiving user interface information for display device 122. A user may enter commands and information into the system 100 through input devices 130 such as a conventional mouse, a key board 130, or the like. Other input devices 134 may include a microphone, joystick, game pad, satellite dish, scanner or the like. The devices may be connected via an Industry Standard Architecture (ISA) bridge 126, or a Universal Serial Bus (USB) bridge 132 to I/O bus 112, respectively. PCI device such as a modem 138 may be connected to the I/O bus 112 via PCI bridge 136.

The exemplary system 100 may further include a hard disk drive 124 for reading from and writing to a hard disk, connected to the I/O bus via a hard disk interface 140, and an optical disk drive 142 for reading from or writing to a removable optical disk 144 such as a CD-ROM or other optical media. The hard disk drive 124 and optical disk drive 142 may be connected to the I/O bus 112 by a hard disk drive interface 140, and an optical drive interface 146, respectively. The drives and their associated computer-readable media provide non-volatile storage of computer readable instructions, data structures, program modules and other data for the system 100. Although the exemplary environment described herein employs a hard disk 124 and a removable optical disk 144, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk 124, optical disk 144, ROM 118 or RAM 116, including an operating system 148, one or more application programs 150, other program modules 152 and program data 154.

The exemplary system 100 may operate in a networked environment using logical connections to one or more remote computers, such as a remote computer 156. The remote computer 156 may be another personal computer, a server, a router, a network PC, a peer device or other common network node, and typically includes many or all of the elements described above relative to the exemplary system 100. The logical connections depicted in FIG. 1 include a network 158, for example, a local area network (LAN) or a wide area network (WAN). Such networking environments are commonplace in offices, enterprise-wide computer networks, Intranets and the Internet.

When used in a networking environment, the exemplary system 100 is connected to the local network 158 through a network interface or adapter 160. The exemplary system 100 may use the modem 138 or other means for establishing communications 162 over a wide area network such as the Internet. In a networked environment, program modules depicted relative to the exemplary system 100, or portions thereof, may be stored in the remote memory storage device. It will be appreciated that the network connections shown are exemplary and other means of establishing a communications link between the computers may be used.

The exemplary embodiment shown in FIG. 1 is provided solely for the purposes of explaining the invention and those skilled in the art will recognize that numerous variations are possible, both in form and function. For instance, the exemplary system 100 may also include a magnetic disc drive, and numerous other optional components. All such variations are believed to be within the spirit and scope of the present invention. The exemplary system 100 and the exemplary figures below are provided solely as examples for the purposes of explanation and are not intended to imply architectural limitations. In fact, this method and system can be easily adapted for use on any programmable computer system, or network of systems, on which software applications can be executed.

Figure 2:
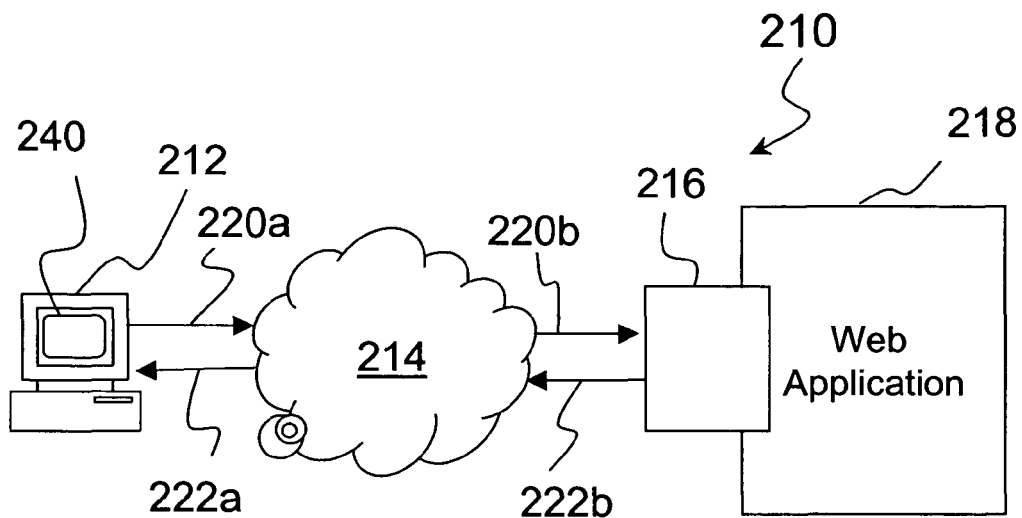
FIG. 2 shows a generic overview of a Web application environment.

FIG. 2 provides an overview of a network 210 with an entry point 216, for example, a validation engine, or an application firewall, separating the Web application 218 with the client browser 240 on a computer 212 over a public network 214 such as Internet. A request 220 is generally intended to include a data flow from a Web browser 240 to a Web application 218. A response 222 is generally intended to include a data flow from a Web application 218 to a Web browser 240. One example of the Web applications 218 is a business reporting engine.

A Web portal arranges Web content into a portal page and provides a common access point to disparate, but related databases and applications of, for example, a business.

A Web portal utilizes re-usable application components such as portlets to access Web accessible information, for example, files published on the corporate intranet to reports on data managed by corporate applications. A portlet is a Web component, which processes and generates dynamic Web content. Portlets may summarize, promote or provide basic access to information resources for users who of business information. Custom portlets can be created by any application or information resource "provider", based on published API specifications. Developers can create procedures as PLJSQL packages or classes.

Web clients interact with portlets through request and response implemented by the portal. Web clients interact with content produced by portlets, for example by submitting forms or following links, sending requests to the portal. The Web portal then forwards the request to the portlets targeted by the user's interactions.

Figure 3:
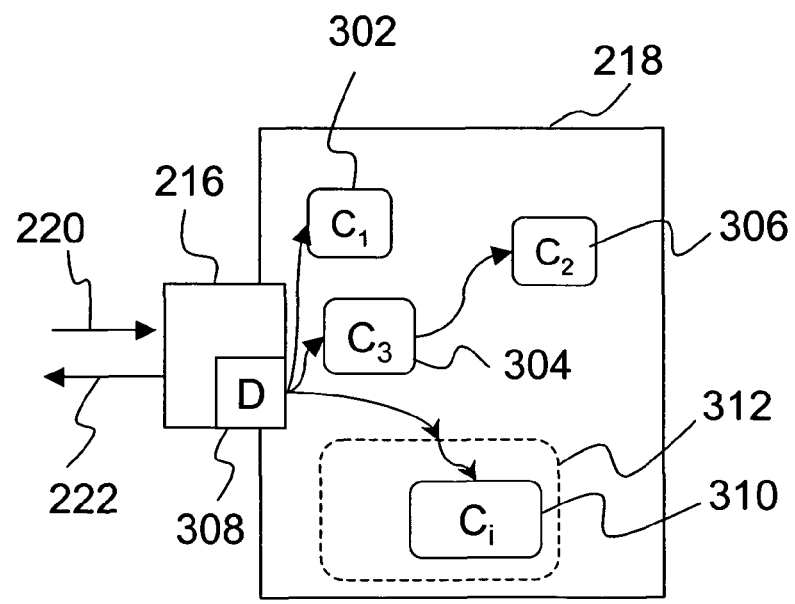
FIG. 3 is a detailed view of a Web application with application components and impromptu component.

FIG. 3 is a detailed view of a Web application 218. The Web application 218 may have one or more Web application components, components 302, 304 and 306. The entry point 216 may have a dispatcher 308 which may inspect an incoming request 222 and dispatch to a proper Web application component for example, component C1 302, component $C_2$ 306 via component $C_3$ 304.

For a Web application 218 such as a business intelligence application to function properly, it may be advantageous or necessary to include an impromptu component 310, to customize the user's experience by integrating services from different applications in the same portal page. The term "impromptu component" is intended to include application components added by the user of a Web application, or installed by other means, for example automatically, to supplement the functionality of the Web application. An example of an impromptu component is a portlet. The impromptu component $C_i$ 310 is managed by an Impromptu Component Manager (ICM) 312. The ICM 312 may manage more than one impromptu components. In case that the impromptu component $C_i$ 310 is a portlet, the impromptu component manager may be, for example, a portal service. The dispatcher 308 dispatches the request 220 destined to the impromptu component $C_i$ 310 through an indication of destination, for example, "destination=icm&subdestination=ci". In this non-limiting example, a request is first sent to the Impromptu Component Manager 312 which then dispatches the request to the impromptu component $C_i$. The expression <target> may be used to represent the indication of destination, for example, "destination=icm&subdestination=ci". Target is intended to include the indication of the destination of the request when dispatched to an impromptu component of the Web application.

Figure 4:
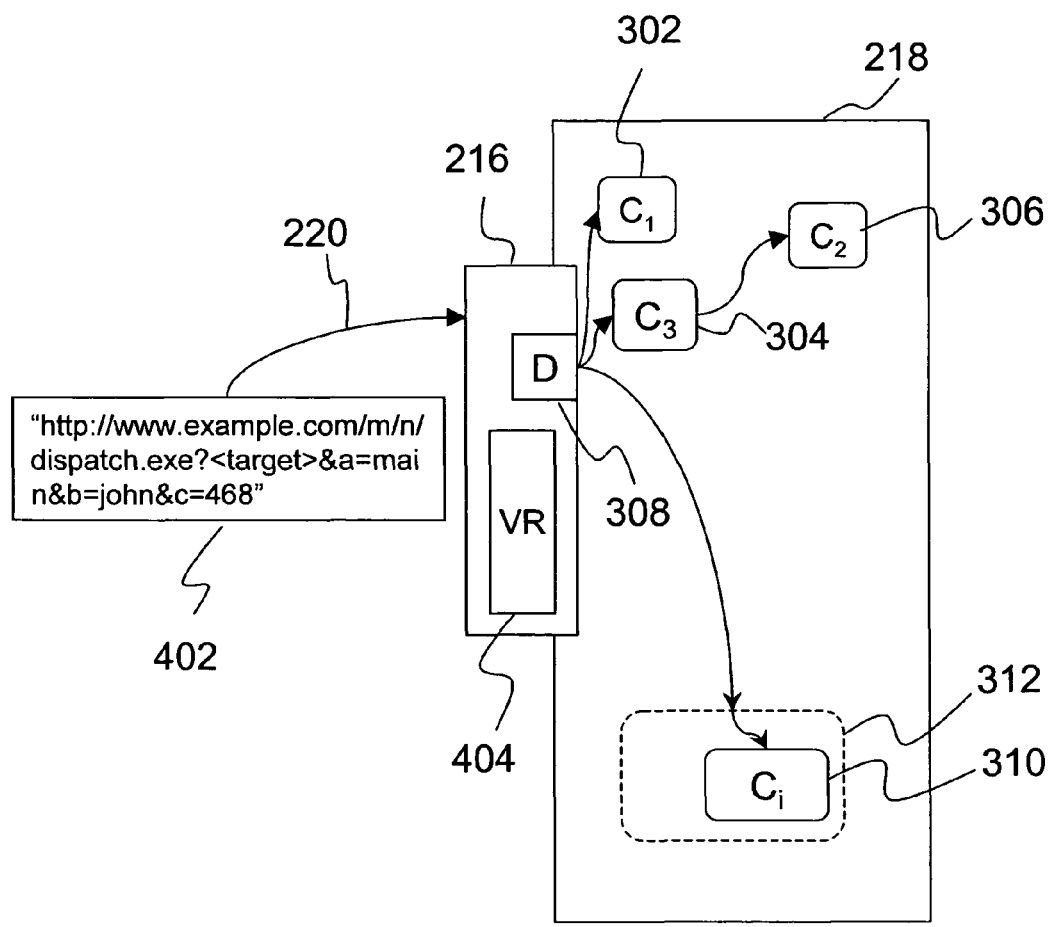
FIG. 4 shows an example of a request being dispatched to an impromptu component.

Referring to FIG. 4, an impromptu component 310 is installed in the Web application 218. A dispatcher 308 at the entry point 216 dispatches the request 220 to the proper application component based on a target in a previous response. In an exemplary request 402 "http://www.example.com/m/n/dispatch.exe?destination=icm&subdestination=ci&a=main&b=john&c=468" or "http://www.example.com/m/n/dispatch.exe?<target>&a=main&b=john&c=468", the expression <target> (destination=icm&subdestination=ci) indicates to the dispatcher 308 the Impromptu Component Manager (ICM) 312 and the impromptu component $C_i$ 310 as the destination for the request 220, where the string "http://www.example.com/m/n" indicates the path to the dispatcher 318, and the string "a=main&b=john&c=468" comprises the parameters for the impromptu component 310.

The entry point 216, which as a non-limiting example may be a validation engine or more specifically an application firewall, may have a set of validation rules 404 for validating the request. An exemplary method for validating request using validation rules is described in the U.S. patent application Ser. No. 11/187,268 titled "Rich Web Application Input Validation", filed on Jul. 22, 2005, the entirety of which is hereby incorporated by reference.

The validation rule 404, however, may not include the parameters of an impromptu component 310 in an existing acceptance validation rule, or may include the parameters in an existing rejection validation rule. Therefore, the request directed at an impromptu component may be rejected.

Because of the nature of impromptu components, updating the validation rules may be impractical, sometimes impossible. For example, existing application components $C_1$ 302 and $C_2$ 306 may have an acceptance validation rule which requires a parameter "home" to have a value of either A or B or C, and the impromptu component $C_i$ 310 has a parameter "home" with the value of 478. It would be impractical or impossible to change the existing acceptance validation rule to accept new parameters of an impromptu component.

Figure 5:
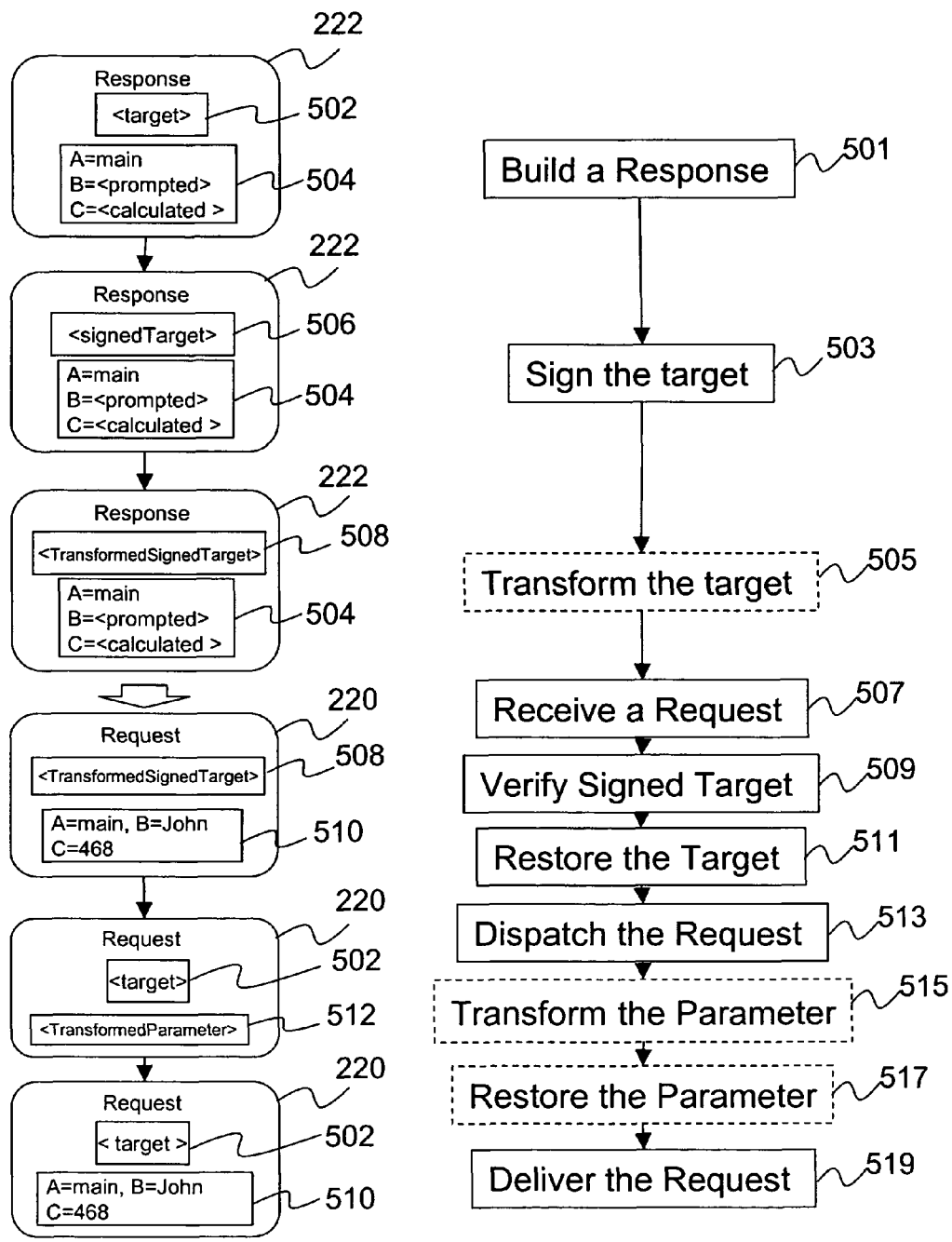
FIG. 5(*a*) shows a response and a request and the corresponding steps in accordance with one embodiment of the present invention.
Figure 6:
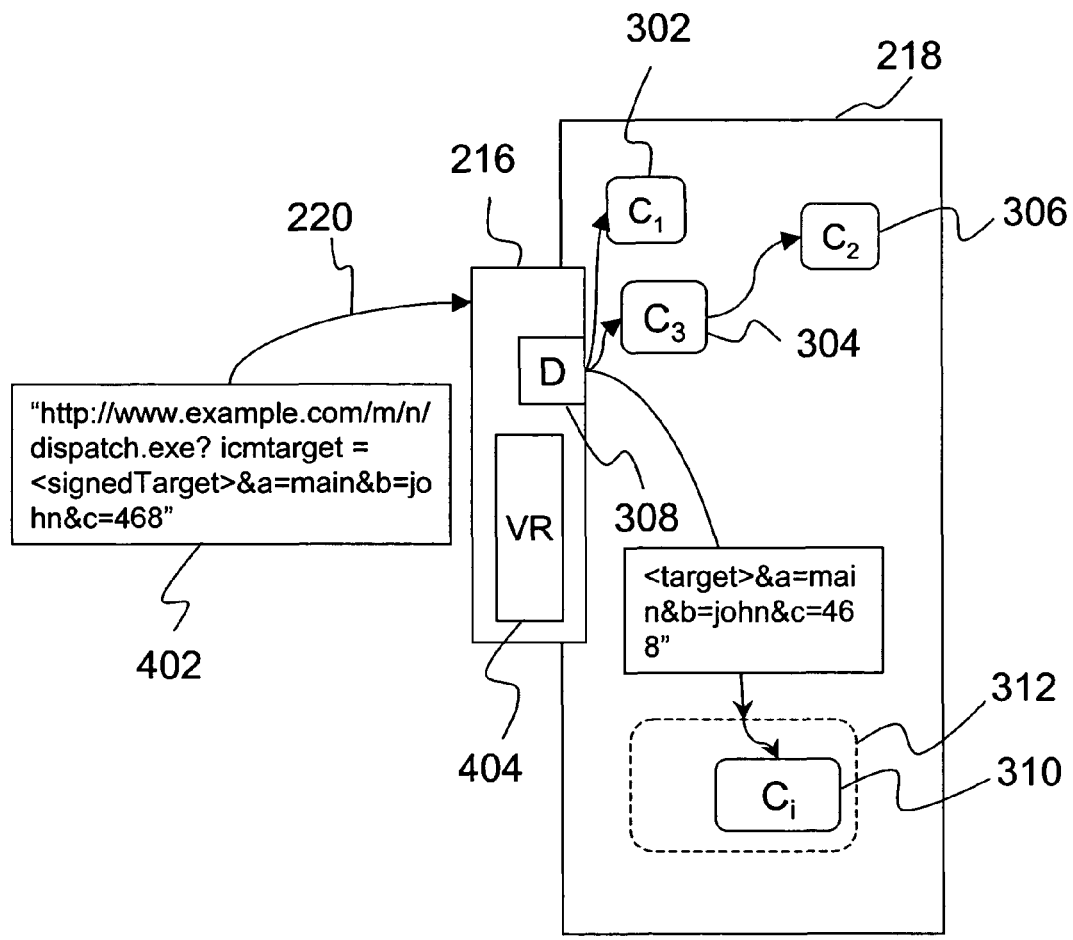
FIG. 6 shows an example of a request being dispatched to an impromptu component in accordance with one embodiment of the present invention.

Referring to FIG. 4 and FIG. 5(a), in accordance with one embodiment of the present invention, a response 222 will be built by an impromptu component 310 at step 501. The response 222 has a target 502, which for example has the destination "destination=icm&subdestination=ci", and a number of parameters 504. The entry point 216 signs at step 503 the target 502 in a response 222 result in a signed target 506. When the target 502 is signed by the entry point 216, for example, at a validation engine or more specifically at an application firewall, a trust is established between the entry point 216 and the impromptu component 310. Alternatively, a trust may be delegated from the entry point to the Impromptu Component Manager 312, and the ICM is entrusted in signing the target. Optionally, since the signing may result in binary data, the signed target may be transformed in step 505, for example by encoding, more specifically by Base 64 encoding, to render it suitable for travel over the HTTP protocol, resulting in a transformed and signed target 508. One form of the transformation is to rearrange names and values of a plurality of parameters of the request. This results in a new unique parameter. Also referring to FIG. 6, when a request 220 is received 507 from a Web client with a signed target 506 or a transformed signed target 508 and filled parameters 510 at the dispatcher 308, the signed target will be verified 509, restored 511 to its original unsigned state 502 and dispatched 513 to the Impromptu Component Manager 312. Based on the trust, the validation rule 408 may be bypassed. Therefore, the parameters in a request with signed target are not subject to validation. To prevent the reuse of the signed target in a different session, a session ID can optionally be used in the signing to restrict the signed target to a specific session. Optionally, the parameters 510 in a request 220 may be transformed 515, for example, encoded by Base64 encoding, result in transformed parameters 512. The transformed parameters may be restored 517 at the Impromptu Component Manager 312 and delivered 519 to the impromptu component 310.

A target may be signed by using a cryptographic Keyed-Hash Message Authentication Code (HMAC). An exemplary method for protecting Web application data is described in the U.S. patent application Ser. No. 11/187,309 titled "Opaque Cryptographic Web Application Data Protection", filed on Jul. 22, 2005, the entirety of which is hereby incorporated by reference. In one of simple cases, a signed target may comprise, for example, the original target, and the calculated HMAC value for the original target. The calculated HMAC value and the original target may be concatenated to a signed target.

The verification of signed target occurs in the entry point 216. The entry point 216 then performs the same HMAC logic as for the signing. The resulting HMAC value must match the HMAC value that is in the signed target. The two HMACs match only if the target in the request is the exact same as in the response.

It should be apparent to a person skilled in the art that other methods of digital signing may also be used to sign the target. For example, RSA public key digital signature.

FIG. 5(b) shows an example of a target. FIG. 5(c) illustrates an example of a signed target with Base64 encoding.

An additional advantage of Base64 encoding is that the "&" character normally used to delimit the parameters will be replaced, as for example in: "http://www.example.com/m/n/dispatch.exe?<Base64target>&a=main&b=john&c=468".

Base64 encoding is often associated with a rearrangement of the names and values of a plurality of parameters, the rearrangement produces a new unique parameter. This rearrangement as discussed before is one form of the transformation. When grouping the target parameters into a new unique parameter value, the "&" character must be encoded or replaced. The uniqueness of the parameter of the target is in the context of the request or the response.

Using the example of "http://www.example.com/m/n/dispatch.exe?icmtarget=<target>&a=main&b=john&c=468" where <target>="destination=icm&subdestination=ci", "destination" and "subdestination" may be considered as the parameters for the dispatcher 308. The impromptu component, for example, $C_i$ 310 may provide information about travel agencies and has already a parameter "destination=paris". Without an encoding or other transformation of the characters, the two parameters would conflict and thus render the response ambiguous.

Figure 7:
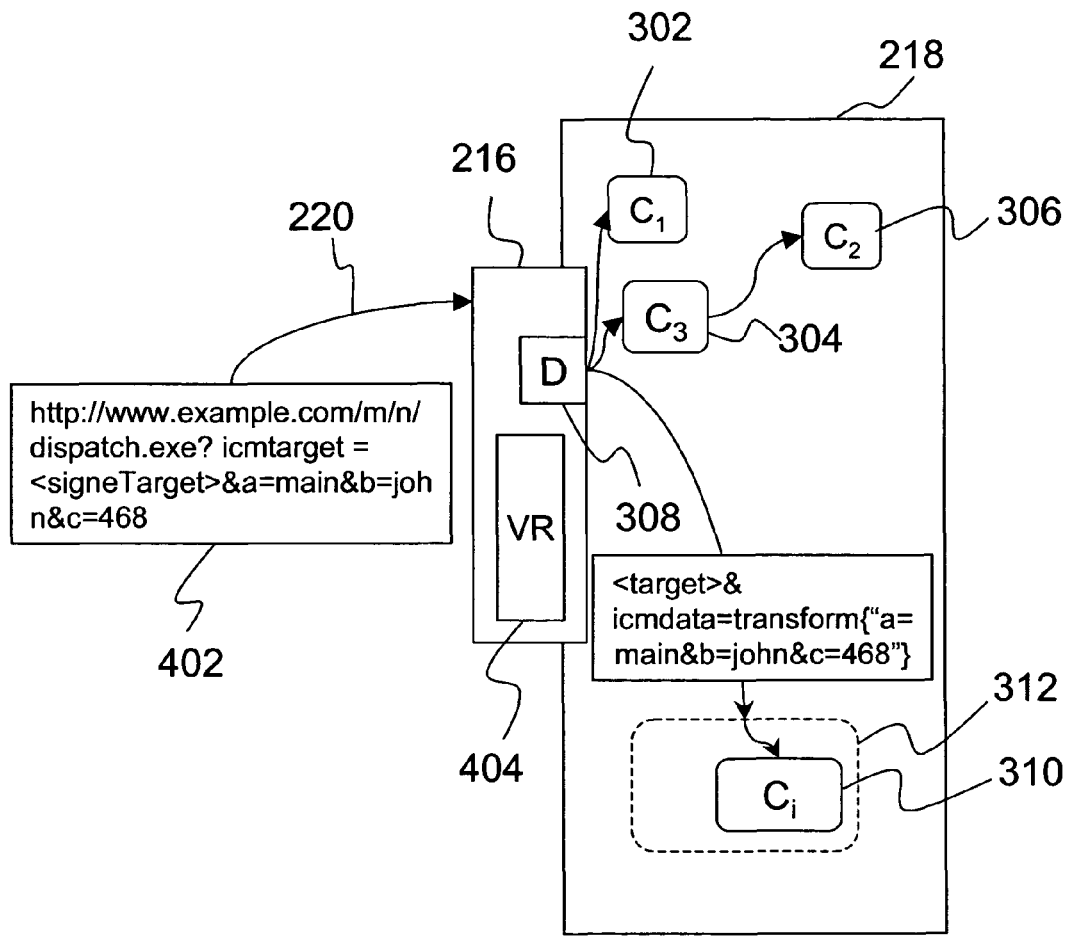
FIG. 7 shows an example of a request being dispatched to an impromptu component in accordance with another embodiment of the present invention.

In accordance with another aspect of the present invention, to avoid a conflict, because for example the parameters have the same name, between the parameters of an impromptu component 310 and the parameters of a dispatcher 308, found in a request 220, a transformation, for example, a Base64 encoding is used for parameters of a request 220. Referring to FIG. 5(a) and FIG. 7, the parameters of a request between the dispatcher 308 and the Impromptu Component Manager 312 is transformed 515. The transformed parameters 512 is restored at the Impromptu Component Manager 312 and passed on to the impromptu component 310. One benefit of this approach is that as the parameters of the impromptu component 310 is transformed, for example, encoded, more specifically Base64 encoded, they are distinctly different than the parameters of the existing application components 302-306. Therefore, the impromptu components will not use the parameters of the existing application components.

Figure 8:
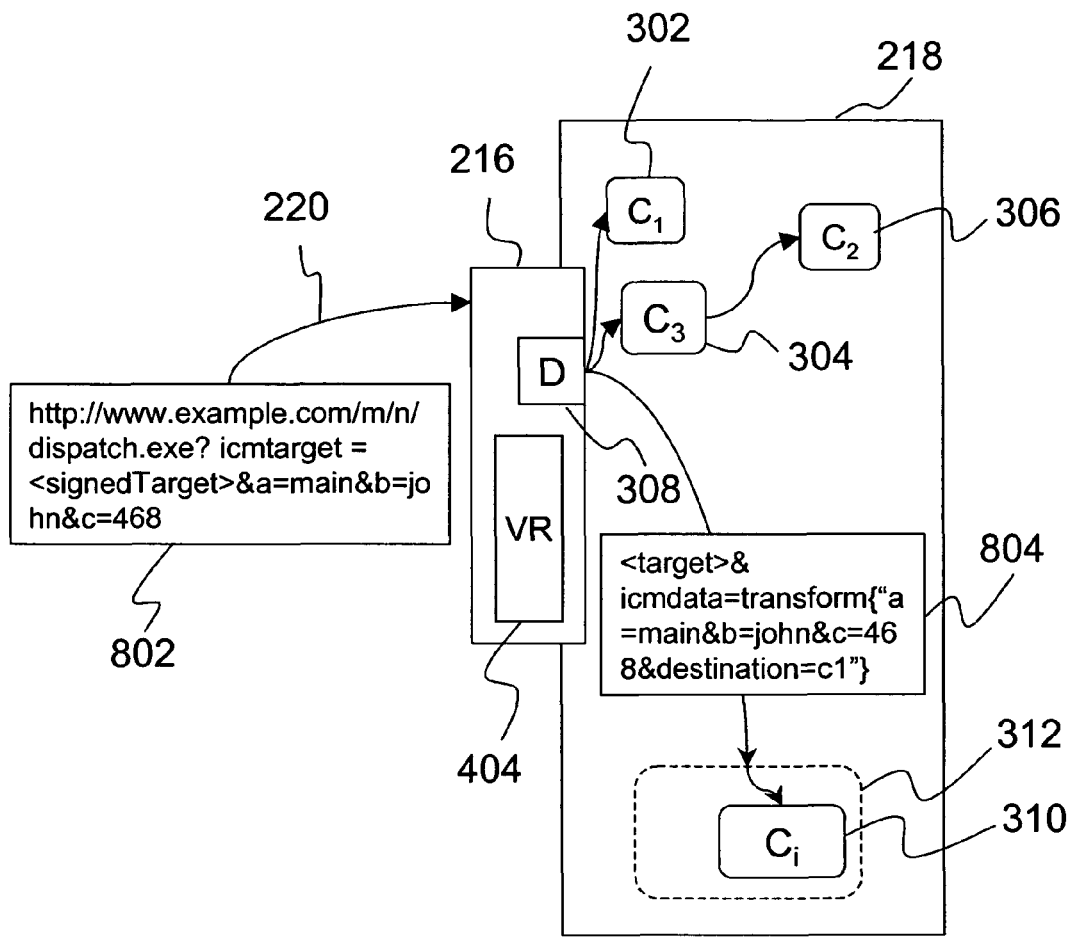
FIG. 8 shows an example of a request being dispatched to an impromptu component in accordance with another embodiment of the present invention.

Another benefit of this approach is that malicious attack may be prevented. Referring to FIG. 8, since a response 220 with a signed target usually bypasses the validation rule 404, an attack could be constructed by injecting an additional destination parameter for application component $C_1$ 802 in a legitimate request. Since an entry point bypasses validation for requests with signed target, and may consider the injected destination in the request with precedence, the request may be dispatched to application component $C_1$ 802 along with malicious intent.

A request 804 with transformed data, keeps the entire data including the injected destination invisible to the dispatcher, thus preventing the dispatching of the request with signed target to an unintended application component.

Web services make dynamic content of the business intelligence available through the Service-Oriented Architecture (SOA). Web services may be provided in an interoperable manner to carry out a complex business transaction. The standards on which web services are based include Hypertext Transfer Protocol (HTTP), Simple Object Access Protocol (SOAP), Extensible Markup Language (XML), Web Services Description Language (WSDL), and Universal Description, Discovery, and Integration(UDDI). SOAP is an XML-based protocol used to send messages for invoking methods in a distributed environment and is used in a preferred embodiment. Therefore, the client of the present invention may be a client using HTTP, SOAP, XML, WSDL, and UDDI.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). Further, a computer data signal representing the software code which may be embedded in a carrier wave may be transmitted via a communication network. Such a computer readable memory and a computer data signal are also within the scope of the present invention, as well as the hardware, software and the combination thereof.

The present invention has been described with regard to one or more embodiments. However, it will be apparent to persons skilled in the art that a number of variations and modifications can be made without departing from the scope of the invention as defined in the claims.

What is claimed is:

1. A method of controlling data transfer between a Web client and a Web application comprising:
    building a response that includes a target, wherein the target indicates a destination of a request that is dispatched to an impromptu component of the Web application and has an original state;
    signing the target with a digital signature to produce a signed target;
    sending the response including the signed target to the Web client;
    receiving the request from the Web client, wherein the request includes the signed target and one or more parameters for the impromptu component;
    determining that the request is directed to the impromptu component by verifying the digital signature of the signed target;
    upon verifying the digital signature of the signed target, bypassing a validation rule for validating the one or more parameters included in the request; and
    restoring the target based at least in part on the signed target in the request to the original state.

2. The method as claimed in claim 1, wherein the impromptu component is a portlet.

3. The method as claimed in claim 1, wherein the target comprises a plurality of request parameters.

4. The method as claimed in claim 1, wherein the Web Application has an entry point.

5. The method as claimed in claim 4, wherein the entry point is an application firewall.

6. The method as claimed in claim 4, wherein the target is signed by the entry point.

7. The method as claimed in claim 4, wherein the entry point is a validation engine.

8. The method as claimed in claim 1, wherein the signing the target further comprises transforming the signed target.

9. The method as claimed in claim 8, wherein the transforming comprises rearranging names and values of a plurality of parameters of the request, resulting in a new unique parameter.

10. The method as claimed in claim 9, further comprising restoring the plurality of parameters.

11. The method as claimed in claim 8, wherein the transforming comprises encoding.

12. The method as claimed in claim 1, wherein the target is signed by an Impromptu Component Manager.

13. The method as claimed in claim 1, wherein the Web client is a simple object access protocol (SOAP) client.

14. A storage medium having a memory readable by a computer encoding a computer program for execution by the computer to carry out a method for controlling data transfer between a Web client and a Web application, wherein the computer program when executed on the computer causes the computer to:
    build a response that includes a target, wherein the target indicates a destination of a request that is dispatched to an impromptu component of the Web application and has an original state;
    sign the target with a digital signature to produce a signed target;
    send the response including the signed target to the Web client;
    receive the request from the Web client, wherein the request includes the signed target and one or more parameters for the impromptu component;
    determine that the request is directed to the impromptu component by verifying the digital signature of the signed target;
    upon verifying the digital signature of the signed target, bypass a the validation rule for validating the one or more parameters included in the request; and
    restore the target based at least in part on the signed target in the request to the original state.

15. The storage medium as claimed in claim 14, wherein the impromptu component is a portlet.

16. The storage medium as claimed in claim 14, wherein the target comprises a plurality of request parameters.

17. The storage medium as claimed in claim 14, wherein the Web Application has an entry point.

18. The storage medium as claimed in claim 17, wherein the entry point is an application firewall.

19. The storage medium as claimed in claim 17, wherein the entry point is a validation engine.

20. The storage medium as claimed in claim 17, wherein the target is signed by the entry point.

21. The storage medium as claimed in claim 14, wherein the signing the target further comprises transforming the signed target.

22. The storage medium as claimed in claim 21, wherein the transforming comprises rearranging names and values of a plurality of parameters of the request, resulting in a new unique parameter.

23. The storage medium as claimed in claim 22, wherein the computer is further caused to restore the plurality of parameters.

24. The storage medium as claimed in claim 21, wherein the transforming comprises encoding.

25. The storage medium as claimed in claim 14, wherein the target is signed by an Impromptu Component Manager.

26. The storage medium as claimed in claim 14, wherein the Web client is a simple object access protocol (SOAP) client.

27. A system comprising:
a processor configured to:
build a response that includes a target, wherein the target indicates a destination of a request that is dispatched to an impromptu component of the Web application and has an original state,
sign the target with a digital signature, to produce a signed target,
send the response including the signed target to the Web client,
receive the request from the Web client, wherein the request includes the signed target and one or more parameters for the impromptu component,
determine that the request is directed to the impromptu component by verifying the digital signature of the signed target,
upon verifying the digital signature of the signed target, bypass a validation rule for validating the one or more parameters included in the request, and
restore the target based at least in part on the signed target in the request to the original state.

28. The system as claimed in claim 27, wherein the impromptu component is a portlet.

29. The system as claimed in claim 27, wherein the target comprises a plurality of request parameters.

* * * * *